US009850166B2

(12) United States Patent
Smith et al.

(10) Patent No.: US 9,850,166 B2
(45) Date of Patent: Dec. 26, 2017

(54) LIQUID COLORING SUSPENSION AND COLORED CEMENTITIOUS COMPOSITION

(71) Applicant: Construction Research & Technology, GmbH, Trostberg (DE)

(72) Inventors: James Curtis Smith, Twinsburg, OH (US); Eric Hevener, Wadsworth, OH (US)

(73) Assignee: Construction Research & Technology, GmbH, Trostberg (DE)

( * ) Notice: Subject to any disclaimer, the term of this patent is extended or adjusted under 35 U.S.C. 154(b) by 0 days.

(21) Appl. No.: 14/881,769

(22) Filed: Oct. 13, 2015

(65) Prior Publication Data

US 2016/0221874 A1 Aug. 4, 2016

Related U.S. Application Data

(60) Provisional application No. 62/111,455, filed on Feb. 3, 2015.

(51) Int. Cl.
| | |
|---|---|
| *C04B 24/38* | (2006.01) |
| *C04B 14/30* | (2006.01) |
| *C04B 16/00* | (2006.01) |
| *C04B 28/04* | (2006.01) |
| *C04B 40/00* | (2006.01) |
| *C04B 111/82* | (2006.01) |
| *C04B 103/54* | (2006.01) |

(52) U.S. Cl.
CPC ............ *C04B 24/38* (2013.01); *C04B 14/305* (2013.01); *C04B 14/308* (2013.01); *C04B 16/00* (2013.01); *C04B 28/04* (2013.01); *C04B 40/0039* (2013.01); *C04B 2103/54* (2013.01); *C04B 2111/82* (2013.01); *Y02W 30/92* (2015.05); *Y02W 30/94* (2015.05)

(58) Field of Classification Search
CPC .............. B01F 17/0021; B01F 17/0028; B01F 17/0042; B01F 17/005; B01F 17/0057; B01F 17/0064; B01F 17/0071; C04B 14/06; C04B 14/062; C04B 14/10; C04B 18/08; C04B 24/2647; C04B 24/267; C04B 24/32; C04B 24/36; C04B 24/425; C04B 24/2658; C04B 24/42; C04B 28/02; C04B 40/0039; C04B 2103/54; C04B 24/38; C04B 14/308; C04B 14/303; C04B 14/305; C04B 14/307; C04B 28/04; C04B 14/022; C04B 14/106; C04B 14/04; C04B 14/30; C04B 14/048; C04B 14/28; C04B 14/36; C04B 14/42; C04B 24/125; C04B 20/0036; C04B 20/0048; C04B 38/10; C04B 2103/61; C04B 2103/65; C04B 2103/67; C04B 2103/69; C04B 2103/46; C04B 2103/50; C04B 2103/58; C04B 2103/603; C04B 2103/302; C04B 2103/304; C04B 2103/408; C04B 2103/0088; C04B 2103/12; C04B 2111/82; C09B 67/00677; C09B 67/009; C09C 1/00; C09C 3/08; C09C 3/10; C01P 2006/22; C01P 2006/60; C01P 2103/408; C01P 2103/44
See application file for complete search history.

(56) References Cited

U.S. PATENT DOCUMENTS

| | | | |
|---|---|---|---|
| 3,980,602 A | | 9/1976 | Jakubauskas |
| 4,004,939 A | | 1/1977 | O'Brien et al. |
| 4,115,435 A | | 9/1978 | O'Brien et al. |
| 4,131,480 A | | 12/1978 | McCurrich et al. |
| 4,494,990 A | | 1/1985 | Harris |
| 4,514,947 A | | 5/1985 | Grail |
| 4,652,313 A | * | 3/1987 | Den Boer ............ C09D 17/001 106/150.2 |
| 4,693,751 A | * | 9/1987 | Den Boer ............ C09D 17/008 106/205.9 |
| 4,741,781 A | | 5/1988 | De Witte |
| 4,750,938 A | * | 6/1988 | Cottrell ................... A23L 1/275 106/146.5 |
| 5,059,248 A | * | 10/1991 | Signorino ................ A61K 9/28 106/400 |
| 5,215,583 A | | 6/1993 | Krockert et al. |
| 5,322,563 A | | 6/1994 | Van Bonn et al. |
| 5,585,427 A | | 12/1996 | Schimmel et al. |
| 5,691,292 A | | 11/1997 | Marshall et al. |
| 5,728,209 A | | 3/1998 | Bury et al. |
| 5,760,257 A | | 6/1998 | Tanaka et al. |
| 5,853,476 A | | 12/1998 | Will |

(Continued)

FOREIGN PATENT DOCUMENTS

| | | | |
|---|---|---|---|
| CN | 102321410 A | * | 1/2012 |
| CN | 103601459 A | * | 2/2014 |
| CN | 104130630 A | * | 11/2014 |
| GB | 2065692 B | | 7/1983 |
| WO | WO 2004/085548 A2 | | 10/2004 |
| WO | WO 2009/038621 A1 | * | 3/2009 |
| WO | WO 2010/130314 A1 | * | 11/2010 |

OTHER PUBLICATIONS

PCT/EP2016/051760—International Search Report, dated Apr. 29, 2016.

(Continued)

*Primary Examiner* — Anthony J Green
(74) *Attorney, Agent, or Firm* — Curatolo Sidoti Co., LPA; Joseph G. Curatolo; Salvatore A. Sidoti

(57) ABSTRACT

A colored cementitious composition is provided that is composed of hydraulic cement and a liquid coloring suspension. The liquid coloring suspension for cementitious compositions contains polycarboxylate dispersant, pigment, and a polysaccharide thixotropic additive. The liquid coloring suspension has improved viscosity consistency, improved shelf-life, anti-settling and anti-sludging properties, and decreased polycarboxylate dispersant requirements.

24 Claims, No Drawings

(56) References Cited

U.S. PATENT DOCUMENTS

| | | | |
|---|---|---|---|
| 5,855,665 A | 1/1999 | Johansen et al. | |
| 5,961,710 A | 10/1999 | Linde et al. | |
| 5,989,336 A | 11/1999 | Carpenter et al. | |
| 6,087,404 A | 7/2000 | Bown et al. | |
| 6,267,814 B1 | 8/2001 | Bury et al. | |
| 6,270,062 B1 | 8/2001 | Chuang et al. | |
| 6,290,770 B1 | 9/2001 | Moreau et al. | |
| 6,294,013 B1* | 9/2001 | Ortlano | C09B 67/0063 106/402 |
| 6,310,143 B1 | 10/2001 | Vickers et al. | |
| 6,391,106 B2 | 5/2002 | Moreau et al. | |
| 6,514,595 B1 | 2/2003 | Sprouts | |
| 6,515,062 B2 | 2/2003 | Jesionka | |
| 6,569,924 B2 | 5/2003 | Shendy et al. | |
| 6,572,697 B2 | 6/2003 | Gleeson et al. | |
| 6,786,965 B2 | 9/2004 | Perry et al. | |
| 6,875,801 B2 | 4/2005 | Shendy et al. | |
| 7,435,766 B2 | 10/2008 | Ong | |
| 7,497,904 B2 | 3/2009 | Dulzer et al. | |
| 7,605,196 B2 | 10/2009 | Schinabeck et al. | |
| 7,758,692 B2* | 7/2010 | Eychenne-Baron | C04B 28/02 106/447 |
| 7,772,300 B2 | 8/2010 | Schinabeck et al. | |
| 7,854,277 B2* | 12/2010 | Duncum | C09K 8/032 166/292 |
| 7,868,167 B2 | 1/2011 | Harding et al. | |
| 7,883,577 B2 | 2/2011 | Sprouts et al. | |
| 7,922,808 B2 | 4/2011 | Brower et al. | |
| 7,999,017 B2 | 8/2011 | Rasmussen et al. | |
| 8,088,842 B2 | 1/2012 | Shendy et al. | |
| 8,158,699 B2 | 4/2012 | Freidrich et al. | |
| 8,377,196 B2 | 2/2013 | Bury et al. | |
| 8,394,191 B2 | 3/2013 | Bury | |
| 8,545,620 B2 | 10/2013 | Frenkenberger et al. | |
| 8,550,690 B2 | 10/2013 | Hines | |
| 8,846,784 B2 | 9/2014 | Gaberlein et al. | |
| 2002/0019459 A1 | 2/2002 | Albrecht et al. | |
| 2004/0149174 A1 | 8/2004 | Farrington et al. | |
| 2004/0198873 A1 | 10/2004 | Bury et al. | |
| 2007/0129469 A1* | 6/2007 | Befurt | B05B 9/0403 524/88 |
| 2008/0156225 A1* | 7/2008 | Bury | C04B 28/02 106/14.05 |
| 2011/0300394 A1* | 12/2011 | Welsch | C08B 30/02 428/532 |

OTHER PUBLICATIONS

PCT/EP2016/051760—International Written Opinion, dated Apr. 29, 2016.

Mohammed Sonebi, "Rheological properties of grouts with viscosity modifying agents as diutan gum and welan gum incorporating pulverised fly ash", Cement and Concrete Research, 2006, vol. 36, pp. 1609-1618.

* cited by examiner

LIQUID COLORING SUSPENSION AND COLORED CEMENTITIOUS COMPOSITION

The present application claims the benefit of the filing date, under 35 U.S.C. §119(e), from U.S. Provisional Application Ser. No. 62/111,455, filed Feb. 3, 2015, which application is incorporated herein by reference.

A pigment, as related to its use in concrete, mortar or cement paste, is defined as a fine dry powder, dry granules, aqueous suspension, or slurry, of the powder or granules, insoluble and inert to the concrete ingredients and which imparts a specific color to the product. The color of a pigment can be described in terms of three properties: hue, value, and chroma, which are indicative of the purity (oxide content) and the brightness of the pigment.

Pigments in the dry form exist as agglomerates of particles. The ease with which the aggregates are broken down and dispersed in concrete, mortar and cement paste depends on the extent to which the forces of attraction between the particles is reduced. The coloring action of pigments is dependent on the extent of smearing over the cement and fine aggregate in the mix. Therefore, cement and fine aggregate contents will significantly influence the degree of coloration achieved.

Dosages of pigments typically decrease slump, increase the water demand and premature stiffening of the cementitious composition and may produce flash setting. To increase the slump of the cementitious mixture additional water is added, however, in general the higher the water content of the mix, the lighter will be the final color. The increased water content also decreases the strength of the resulting cementitious composition.

Therefore, it is desirable to provide a colored cementitious composition comprising a liquid coloring suspension which contains a dispersant and a pigment that maintains or improves the color, increases or has no effect on slump, and lowers or has no effect on the water demand of the cementitious composition. Therefore, a liquid coloring suspension which maintains or improves the color of cementitious compositions without increasing the water content or decreasing slump is advantageous in the industry.

A liquid coloring suspension is provided that has long term stability, reduces the water content and viscosity of cementitious compositions and maintains or increases the color by improving pigment dispersion throughout the mixture.

A liquid coloring suspension is also provided having improved viscosity consistency, improved shelf-life, anti-settling and anti-sludging properties, and decreased polycarboxylate dispersant requirements. The requirement for the polycarboxylate dispersant is decreased not only for the coloring suspension, but also with respect to polycarboxylate water reducers added to cementitious compositions containing the liquid coloring suspension.

A cementitious composition containing the liquid coloring suspension is also provided, as well as a method for preparing such a colored cementitious composition.

In contrast to conventional pigmented cementitious formulations, made by mixing hydraulic cement, a pigment dispersant and a powdered pigment or a dispersion thereof, cementitious formulations made by mixing a hydraulic cement and a liquid coloring suspension comprising a dispersion of a polycarboxylate and a pigment, synergistically exhibit water neutrality or decreased, rather than increased, water demand. These pigmented cementitious formulations also exhibit excellent compressive strength after set, and no retardation of set compared to a corresponding non-pigmented formulations. The cementitious formulation made according to the present method exhibits increased color strength compared to conventional pigmented concretes.

A colored cementitious composition which has a liquid coloring suspension is provided that has effective or improved color dispersion and a neutral or reduced water content, as well as a method for preparing such a colored cementitious composition.

Polycarboxylate dispersants are effective at dispersing cement and reducing the water content in hydraulic cementitious compositions. These dispersants operate by binding to a cement particle and developing both electrostatic and steric repulsive forces, thereby keeping the particles apart, resulting in a more fluid system.

The term polycarboxylate dispersant throughout this specification refers to polymers with a carbon backbone with pendant side chains, wherein at least a portion of the side chains are attached to the backbone through a carboxyl group, an ether group, an amide group or an imide group. Polycarboxylate dispersants typically include cement particle bonding moieties, such as but not limited to carboxylic acid groups, and dispersing side chains that may include polyoxyalkylene ethers, and may further include other functional moieties. Polycarboxylate copolymers may contain structural units derived from or produced to include moieties of mono- or di-carboxylic acids, mono- or di-carboxylic acid esters, alkenyl ethers, and other ethylenically unsaturated species. In certain embodiments, the polycarboxylate copolymer may also comprise hydrolysable moieties that expose additional cement particle-binding functional moieties on the polymer upon hydrolysis. The term dispersant is also meant to include those chemicals which also function as a plasticizer, water reducer, fluidizer, antiflocculating agent, or superplasticizer for cementitious compositions.

The polycarboxylate dispersant used in the admixture, cementitious composition, and method may include but is not limited to dispersants or water reducers sold under the trademarks GLENIUM® 3030NS, GLENIUM® 7101, GLENIUM® 7500, GLENIUM® 7700, GLENIUM® 7710, or GLENIUM® 3000NS® (BASF Admixture Systems, Cleveland, Ohio), ADVA® (W. R. Grace Inc., Cambridge, Mass.), VISCOCRETE® (Sika, Zurich, Switzerland), and SUPERFLUX® (Axim Concrete Technologies Inc., Middlebranch, Ohio).

In one embodiment the admixture composition contains about 0.5% to about 3% polycarboxylate dispersant solids based on the total weight of the liquid coloring suspension. In another embodiment the admixture composition contains about 1% to about 2.5% polycarboxylate dispersant solids based on the total weight of the liquid coloring suspension. In another embodiment a cementitious composition contains about 0.0008% to about 0.51% polycarboxylate dispersant solids contributed by the liquid coloring suspension by dry weight of cementitious binder. In a further embodiment a cementitious composition contains about 0.004% to about 0.25% polycarboxylate dispersant solids contributed by the liquid coloring suspension by dry weight of cementitious binder.

Coloring admixtures in the form of slurries or dispersions are used for four main reasons: (a) to enhance the wetting and dispersion characteristics of materials containing very fine particles with inherently poor wettability; (b) enable dispersion through commonly used equipment; (c) for easier addition to concrete transportation vehicles due to pigment slurry providing uniformly colored concrete mixtures; and (d) to reduce health hazards that may result by handling fine powders. These coloring admixtures are usually composed of pigments, either organic such as phthalocyanine or inorganic pigments such as carbon black or metal-containing pigments that comprise, but are not limited to, metal oxides and others, and can include, but are not limited to, iron oxide, chromium oxide, aluminum oxide, lead chromate, titanium oxide, zinc white, zinc oxide, zinc sulfide, lead white, iron manganese black, cobalt green, manganese blue, manganese violet, cadmium sulfoselenide, chromium orange, nickel titanium yellow, chromium titanium yellow, cadmium sulfide, zinc yellow, ultramarine blue and cobalt blue.

The color of a pigment can be described in terms of three properties: hue, value, and chroma, which are indicative of the purity (oxide content) and the brightness of the pigment. Hue is the property of a color which distinguishes red from yellow, blue, etc. Value or lightness denotes the light reflecting quality or lightness of a color. Chroma or saturation is the richness or depth of hue or a color and is a measure of its departure from a gray or neutral of equal value.

In one embodiment the liquid coloring suspension contains about 50% to about 75% pigment solids based on the total weight of the liquid coloring suspension. In another embodiment the liquid coloring suspension composition contains about 53% to about 70% pigment solids based on the total weight of the liquid coloring suspension. In another embodiment a cementitious composition contains about 0.1% to about 10% pigment solids by dry weight of cementitious binder. In a further embodiment a cementitious composition contains about 0.25% to about 6% pigment solids by dry weight of cementitious binder.

Certain pigment dispersions (liquid coloring suspensions) of the prior art do not effectively disperse the pigment particles in cement and concrete mixtures, particularly when the concentration of pigment in the liquid coloring suspension is high (admixture composition with greater than 55% pigment solids). Additionally, as the concentration of pigment in these liquid coloring suspension increases, the pigment particles begin to separate and settle out of solution, providing a poor storage life for the admixture. There are metal containing (iron oxide) pigment dispersions in the prior art with higher than 50% pigment solids, but these dispersions have been formulated for paints or plastics and have negative effects in cement and concrete such as increasing entrapped air. In cementitious mixtures, elevated air decreases design yield and compressive strength, and causes other deleterious effects.

The liquid coloring suspension which contains a polycarboxylate dispersant improves the dispersion of pigment particles in cementitious compositions when compared to the coloring admixtures in the prior art. Addition of pigment dispersions to cementitious compositions conventionally increases the water demand and decreases the slump, which is one measure of the consistency of concrete. This increase in water demand becomes greater at higher doses of liquid coloring suspension, especially as the concentration of pigment particles in the pigment dispersion increases. In contrast, the subject liquid coloring suspension does not increase the water demand of the cementitious composition even when dosed at high concentrations by weight of cement. Further, the pigment dispersion improves the color of cementitious compositions.

Metal containing (iron oxide) pigment dispersions in the prior art with higher than 50% pigment solids tend to gain viscosity over time which leads to gel formation and decreased shelf life. In addition, some pigment dispersions (liquid coloring suspensions) of the prior art effectively disperse the pigment particles in cement and concrete mixtures but often cause negative effects such as increasing entrapped air. In cementitious mixtures, elevated air decreases compressive strength, makes finishing more difficult, and causes other deleterious effects.

Thixotropic additives decrease pigment separation and settling in liquid coloring suspensions and induce them to thicken up rapidly to form gel structures, i.e., increase its viscosity. The gel structures are self supporting and lower the hydrostatic pressure to the formation as gel strength increases. Thixotropic additives have formerly included organic or synthetic polymers, cellulose or cellulose blended with other materials, such as dispersants, organic flocculents, bentonite clay and organoclays such as hectorite clay or smectite clay.

With respect to certain liquid coloring suspensions for cementitious compositions, there has been observed high and/or variable viscosity in the liquid coloring suspension admixture product, settling of the pigment, such as iron oxide, and sludge buildup, resulting in container, tank and system cleanup difficulties.

One cause of settling and waste or "sludge" buildup that has been identified is the use of clay, such as smectite or bentonite clay, in certain liquid coloring suspensions, or dispersions. The clay material can be unpredictable and its properties are subject to pH, and energy and time in shear. Also, clay materials may contribute to fluid loss of suspensions. Further, clay, such as bentonite clay, is highly adsorptive and absorptive of the polycarboxylate dispersant used in the suspensions as well as in cementitious compositions generally. This adsorptive and absorptive affinity can lead to exfoliation of the clay, negatively impacting pigment dispersion, settling of particles, and sludging.

We have found that the use of a polysaccharide thixotropic additive in the liquid coloring suspension, results in bulk stability, improvement of suspension viscosity, viscosity consistency over time, pumpability of the liquid coloring suspension, reduction in solids settling and sludging, and increased ease of clean-up and maintenance of dispensing equipment, containers, tanks and vessels during maintenance cycles.

The thixotropic additive may therefore comprise a polymeric viscous solution or suspension comprised of a polysaccharide, in certain embodiments, a microbially derived polysaccharide, such as diutan gum, welan gum or xanthan gum viscous solution or suspension. The reference herein to the polysaccharide additive as a "solution" therefore includes both a viscous solution and a suspension in water.

Further, the polysaccharide thixotropic additive, such as a diutan polysaccharide, avoids the absorptive or adsorptive effects of polycarboxylate dispersant by clay materials, imparts a further lubricating effect, and allows for a reduction of the amount of polycarboxylate required in the liquid coloring suspension and in the cementitious composition in general. Dispersants other than polycarboxylate dispersants may additionally be used in the liquid coloring suspension and/or the cementitious composition.

Also, the use of a polysaccharide thixotropic additive, such as a diutan solution or suspension, in the liquid coloring suspension permits the use of additional pigment components in the coloring suspension that might otherwise have been incompatible with former thixotropic additives, such as for reasons of pH of the coloring formulation and/or of incompatibilities caused by methods of manufacture of the pigment. The pH of the subject liquid coloring suspension may generally be in the range of about 8 to less than about 10, in certain embodiments, about 8.5 to about 9.5.

The subject liquid coloring suspension containing the polysaccharide thixotropic additive maintains tint strength of the pigment components, and is compatible with conventional admixture products used in cementitious compositions.

In certain embodiments, the subject liquid coloring suspension is free of clay materials. In certain embodiments, the subject liquid coloring suspension is free of cellulosic materials.

In one embodiment the liquid coloring suspension contains about 0.025% to about 1% thixotropic additive based on the total weight of the liquid coloring suspension. In another embodiment the liquid coloring suspension contains about 0.1% to about 0.7% thixotropic additive based on the total weight of the liquid coloring suspension. In another embodiment a cementitious composition contains about 0.00008% to about 0.17% thixotropic additive contributed by the liquid coloring suspension by total dry weight of cementitious binder. In a further embodiment a cementitious composition contains about 0.0004% to about 0.07% thixotropic additive contributed by the liquid coloring suspension by total dry weight of cementitious binder.

While not being limited to theory it is thought that there is a negative synergistic effect caused by the interaction of the polycarboxylate dispersant with the thixotropic additive, as it would be expected based on the prior art that the thixotropic additive would increase the viscosity of the liquid coloring suspension when compared to a liquid coloring suspension containing polycarboxylate dispersant and pigment alone. However, the liquid coloring suspension containing the thixotropic additive has the unexpected result of having a lower viscosity than that of the admixture containing polycarboxylate dispersant and pigment alone, coupled with long term stability (low viscosity). Additionally, as compared to the pigment dispersions of the prior art where the viscosity increases over time causing gelling, the viscosity of the liquid coloring suspension decreases then stabilizes over time. Based on the prior art, it is expected that a liquid coloring suspension, used to impart color to a cementitious composition, containing a dispersant and thixotrope additive would increase in viscosity over time causing the liquid coloring suspension to gel. In the present instance, there is an unexpected synergistic effect due to the interaction of the polycarboxylate dispersant with the thixotropic additive that causes the viscosity of the liquid coloring suspension to decrease, then stabilize over time. This results in increased shelf life stability of the liquid coloring suspension.

As used herein, the term cement refers to any hydraulic cement. Hydraulic cements are materials that set and harden in the presence of water. Suitable non-limiting examples of hydraulic cements include Portland cement, modified portland cement, masonry cement, alumina cement, refractory cement, magnesia cements, such as a magnesium phosphate cement, a magnesium potassium phosphate cement, calcium aluminate cement, calcium sulfoaluminate cement, ground granulated blast-furnace slag, blended slag, fly ash or pozzolan cement, natural cement, hydraulic hydrated lime, and mixtures thereof. By portland cement is meant all cementitious compositions which have a high content of tricalcium silicate and includes portland cement and cements that are chemically similar or analogous to portland cement, the specification for which is set forth in ASTM specification C 150. Portland cement, as used in the trade, means a hydraulic cement produced by pulverizing clinker, comprising of hydraulic calcium silicates, calcium aluminates, and calcium ferroaluminates, with one or more of the forms of calcium sulfate as an interground addition. Portland cements according to ASTM C150 are classified as types I, II, III, IV, or V.

Pastes are defined as mixtures composed of a hydraulic cement binder, either alone or in combination with pozzolans such as fly ash, silica fume, or blast furnace slag, and water.

Other pozzolans may include natural pozzolans, metakaolin or calcined clay. Mortars are defined as pastes that additionally include fine aggregate. Concretes are mortars that additionally include coarse aggregate.

Aggregate that may be included in the cementitious composition may be silica, quartz, sand, crushed marble, glass spheres, granite, limestone, calcite, feldspar, alluvial sands, any other durable aggregate, or mixtures thereof.

The cementitious compositions described herein may contain other additives or ingredients and should not be limited to the stated or exemplified formulations. Cement additives that can be added independently include, but are not limited to: air entrainers, freeze-thaw resistance admixtures, aggregates, pozzolans, other fillers, set and strength accelerators/enhancers, foaming agents, air detraining agents, set retarders, water reducers, corrosion inhibitors, wetting agents, water soluble polymers, rheology modifying agents, water repellents, fibers, dampproofing admixtures, gas formers, permeability reducers, pumping aids, fungicidal admixtures, germicidal admixtures, insecticide admixtures, finely divided mineral admixtures, alkali-reactivity reducer, bonding admixtures, shrinkage reducing admixtures, crack reducing admixtures, polymeric microspheres, and any other admixture or additive that does not adversely affect the properties of the liquid coloring suspension or cementitious composition. The cementitious compositions need not contain one of each of the foregoing additives.

EXAMPLES

Samples 1-3

Light red, iron oxide liquid coloring suspension formulations were prepared according to the components and amounts indicated in Table 1A, with Comparative Sample 1 containing a stabilized, powdered, dispersible smectite clay thixotropic additive, and Samples 2 and 3 containing a diutan polysaccharide thixotropic additive. The clay was stabilized with a cellulosic material.

The samples were evaluated for initial pH and viscosity. The viscosity readings at one (1) day were taken by Brookfield viscometer at 60 rpm with a #64 spindle, after being stirred for 30 seconds. The results in centipoise (cps) are shown in Table 1A.

TABLE 1A

Liquid Coloring Suspension Formulations

| | Sample No. | | |
| --- | --- | --- | --- |
| | Comparative 1 | 2 | 3 |
| Components | Grams | | |
| Initial H$_2$O | 221 | 221 | 221 |
| Initial NaOH (50%) | 0.5 | 0.5 | 0.5 |
| Clay and Stabilizer | 1.55 | | |
| Diutan Polysaccharide | | 1.5 | 0.75 |
| Polycarboxylate | 20 | 20 | 20 |
| Iron Oxide (Light Red) | 600 | 600 | 600 |
| Final H$_2$O | 152 | 152 | 152 |
| Final NaOH (50%) | 1.8 | 1.8 | 1.8 |

TABLE 1A-continued

Liquid Coloring Suspension Formulations

| | Sample No. | | |
|---|---|---|---|
| | Comparative 1 | 2 | 3 |
| Components | | Grams | |
| Biocide | 2.3 | 2.3 | 2.3 |
| Initial pH | 9.14 | 9.2 | 9.2 |
| 1 day viscosity (cps) | 2100 | 3100 | 1150 |

The samples were further evaluated using the CIE L*a*b* (CIELAB) test to determine whether the liquid coloring suspension samples containing the diutan polysaccharide thixotropic additive had approximately the same color strength as the clay containing sample. The results reported in Table 1B indicate that the color strength of Samples 2 and 3 were within about 5 to 8% of Comparative Sample 1. It was noted that Sample 3 may not have been ground as thoroughly as Sample 2 in the preparation of the suspension, accounting for its lower color strength.

TABLE 1B

Color Readings

| Sample No. | L | a | b | ΔE | % ST |
|---|---|---|---|---|---|
| Comparative 1 | 64.21 | 23.94 | 14.44 | — | — |
| 2 | 64.95 | 23.73 | 14.48 | 0.77 | 94.9 |
| 3 | 65.31 | 23.60 | 14.41 | 1.15 | 92.3 |

Samples 4-7

Yellow iron oxide liquid coloring suspension formulations were prepared according to the components and amounts indicated in Table 2A, with Samples 4 and 5 containing a diutan polysaccharide thixotropic additive.

TABLE 2A

| | Sample No. | |
|---|---|---|
| | 4 | 5 |
| Components | | Grams |
| Initial H$_2$O | 220 | 220 |
| Initial NaOH | 0.4 | 0.4 |
| Diutan Polysaccharide | 0.6 | 0.3 |
| Polycarboxylate | 29.0 | 29.0 |
| Iron Oxide (Yellow) | 581 | 581 |
| Final H$_2$O | 161 | 161 |
| Final NaOH | 3.8 | 3.8 |
| Biocide | 2.9 | 2.9 |
| Initial pH | 8.6 | 8.54 |
| 1 day viscosity (cps) | 3600 | Not tested |

Comparative Samples 6 and 7 were laboratory produced, standard yellow iron oxide pigment suspensions containing a stabilized, powdered, dispersible smectite clay thixotropic agent.

The samples were evaluated using the CIELAB test to determine whether the liquid coloring suspension samples containing the diutan polysaccharide thixotropic additive had approximately the same color strength as the clay containing samples. The results reported in Table 2B indicate that the color strengths of Samples 4 and 5 were greater by about 2% than Comparative Samples 6 and 7.

TABLE 2B

Color QC

| Sample No. | L | a | b | ΔE | ST % |
|---|---|---|---|---|---|
| 4 | 83.53 | 8.05 | 29.70 | 0.86 | 101.98 |
| 5 | 83.35 | 8.05 | 29.54 | 0.68 | 102.28 |
| Comparative 6 | 82.90 | 8.53 | 29.37 | — | — |
| Comparative 7 | 82.90 | 8.51 | 29.32 | .06 | — |

Samples 8-10

Black iron oxide liquid coloring suspension formulations were prepared according to the components and amounts indicated in Table 3A, with Comparative Sample 8 containing a powdered, dispersible smectite clay thixotropic additive, and Samples 9 and 10 containing a diutan polysaccharide thixotropic additive.

Viscosity measurements for Samples 9 and 10 indicated that the liquid color suspensions containing a diutan polysaccharide thixotropic additive maintained a consistent viscosity over time.

TABLE 3A

| | Sample No. | | |
|---|---|---|---|
| | Comparative 8 | 9 | 10 |
| Components | | Grams | |
| Initial H$_2$O | 224 | 225 | 225 |
| NaOH 50% | 0.3 | 0.3 | 0.3 |
| Clay | 2.5 | | |
| Diutan Polysaccharide | | 0.75 | 0.25 |
| Polycarboxylate | 35.0 | 35.0 | 35.0 |
| Iron Oxide (Black) | 650 | 650 | 650 |
| Final H$_2$O | 84 | 85 | 85 |
| Biocide | 3.30 | 3.30 | 3.30 |
| Initial pH | 9.72 | 9.6 | 9.62 |
| 1 day viscosity (cps) | 4000 | 3550 | 2400 |
| 30 day viscosity (cps) | 3370 | 3530 | 2480 |

The samples were evaluated using the CIELAB test to determine whether the liquid coloring suspension samples containing the diutan polysaccharide thixotropic additive had approximately the same color strength as the clay containing samples. The results reported in Table 3B indicate that the color strengths of Samples 8-10 were substantially the same.

TABLE 3B

Color Readings

| Sample No. | L | a | b | ΔE | ST % |
|---|---|---|---|---|---|
| Comp. 8 | 63.21 | −.02 | −3.48 | — | — |
| 9 | 63.22 | 0.00 | −3.49 | 0.02 | 99.9 |
| 10 | 63.16 | −.02 | −3.47 | 0.06 | 100.3 |

Samples 11 & 12

Medium red, iron oxide liquid coloring suspension formulations were prepared according to the components and amounts indicated in Table 4A, with Comparative Sample 11 containing a stabilized, powdered, dispersible smectite clay thixotropic additive, and Sample 12 containing a diutan polysaccharide thixotropic additive. Stability was visually evaluated after seven days, with 150 gram portions of the samples being held at 50° F., 70° F., and 90° F. Comparative Sample 11 exhibited water separation at all three temperatures, while Sample 12 exhibited no water separation at any of the temperatures.

TABLE 4A

| | Sample No. | |
|---|---|---|
| Components | Comparative 11 Grams | 12 Grams |
| Initial H$_2$O | 207 | 207 |
| Initial NaOH (50%) | 0.4 | 0.4 |
| Clay and Stabilizer | 1.75 | |
| Diutan Polysaccharide | | 1 |
| Polycarboxylate | 20 | 20 |
| Iron Oxide (Medium Red) | 596 | 596 |
| Final H$_2$O | 170 | 170 |
| Final NaOH (50%) | 2.3 | 2.3 |
| Biocide | 2.2 | 2.2 |
| Initial pH | 9.79 | 9.64 |
| 1 day viscosity (cps) | 1200 | 1200 |

The samples were evaluated using the CIELAB test to determine whether the liquid coloring suspension samples containing the diutan polysaccharide thixotropic additive had approximately the same color strength as the clay containing sample. The results reported in Table 4B indicate that the color strengths of Samples 11 and 12 were substantially the same.

TABLE 4B

| | Color Readings | | | | |
|---|---|---|---|---|---|
| | L | a | b | ΔE | ST % |
| Comp. 11 | 65.5 | 20.46 | 8.05 | — | — |
| 12 | 65.32 | 20.52 | 8.15 | 0.17 | 99.58 |

Samples 13 & 14

Black, iron oxide/carbon black liquid coloring suspension formulations were prepared according to the components and amounts indicated in Table 5A, with Comparative Sample 13 containing a powdered, smectite clay thixotropic additive, dispersed with a polyacrylate dispersant, and Sample 14 containing a diutan polysaccharide thixotropic additive.

TABLE 5A

| | Sample No. | |
|---|---|---|
| Components | Comparative 13 Grams | 14 Grams |
| Initial H$_2$O | 232 | 232 |
| NaOH | 0.3 | 0.3 |
| Clay | 1.1 | — |
| Polymer Dispersant | 1.5 | — |
| Diutan Polysaccharide | — | 0.25 |
| Polycarboxylate | 13.9 | 13.9 |
| Iron Oxide (Black) | 630 | 630 |
| Carbon Black | 36 | 3.6 |
| Final H$_2$O | 83 | 85 |
| Biocide | 2.5 | 2.5 |
| Initial pH | 9.24 | 9.56 |
| 1 day viscosity (cps) | 1900 | 1740 |

A blend was made of 150 grams of each of the suspensions of Samples 13 and 14. The one day viscosity measurement of the blend was 1870 centipoise, indicating that the polysaccharide containing suspension can be blended with the clay containing suspension, if desired.

Comparative Sample 13 was slightly chunky at 40 days old, with slight build-up on the bottom. Sample 14 was smooth throughout, with very slight thickening on the bottom.

The samples were evaluated using the CIELAB test to determine whether the liquid coloring suspension samples containing the diutan polysaccharide thixotropic additive had approximately the same color strength as the clay containing sample. The results reported in Table 5B indicate that the color strength of Sample 14 was slightly higher than that of Comparative Sample 13.

TABLE 5B

| | Color Readings | | | | |
|---|---|---|---|---|---|
| Sample No. | L | a | b | ΔE | ST % |
| Comp. 13 | 61.90 | −0.24 | −3.75 | — | — |
| 14 | 61.62 | −0.19 | −3.66 | 0.30 | 101.16% |

Sample 15

A black, iron oxide/carbon black liquid coloring suspension formulation containing a diutan polysaccharide thixotropic additive was prepared according to the components and amounts indicated in Table 6. Viscosity readings were consistent at 4 and 9 days, indicating stability over the period. This sample was tested in a cementitious composition at various concentrations, in comparison with a comparative clay containing sample, reported in Table 10, below.

TABLE 6

| | Sample No. |
|---|---|
| Components | 15 Grams |
| Initial H$_2$O | 464 |
| Diutan Polysaccharide | 1.0 |
| Polycarboxylate | 28 |
| Iron Oxide (Black) | 1260 |
| Carbon Black | 72 |
| Final H$_2$O | 170 |
| Biocide | 5.0 |
| Initial pH | 9.20 |
| 4 day viscosity (cps) | 2200 |
| 9 day viscosity (cps) | 2100 |

Samples 16 & 17

A black and a light red iron oxide liquid coloring suspension formulation containing a diutan polysaccharide thixotropic additive was prepared according to the components and amounts indicated in Table 7. No NaOH was added to the formulation of Sample 16, and no initial NaOH was added to the formulation of Sample 17. Nevertheless, there was little deviation from the target pH of 9 for the formulations (the target being for stabilization purposes of the comparative clay sample), and the viscosity measurements for Sample 16 indicated that the liquid coloring suspension containing a diutan polysaccharide thixotropic additive maintained a consistent viscosity over time.

TABLE 7

| Components | Sample No. 16 Black Grams | Sample No. 17 Light Red Grams |
|---|---|---|
| Initial $H_2O$ | 225 | 221 |
| NaOH | — | — |
| Diutan Polysaccharide | 0.5 | 1.0 |
| Polycarboxylate | 18.0 | 18.0 |
| Iron Oxide | 650 | 600 |
| Final $H_2O$ | 103 | 156 |
| Final NaOH | — | 1.5 |
| Biocide | 2.0 | 2.3 |
| Initial pH | 9.2 | 8.78 |
| 1 day viscosity (cps) | 2380 | 1450 |
| 7 day viscosity (cps) | 2580 | Not tested |

Samples 18 & 19

White, titanium oxide liquid coloring suspension formulations were prepared according to the components and amounts indicated in Table 8. The size and particle shape of the titanium dioxide permitted a lower viscosity for the suspensions to maintain stability of the dispersions.

TABLE 8

| Components | Sample No. 18 Grams | Sample No. 19 Grams |
|---|---|---|
| Initial $H_2O$ | 220 | 220 |
| NaOH 50% | 0.4 | — |
| Diutan Polysaccharide | 0.25 | 0.25 |
| Polycarboxylate | 20.0 | 16.0 |
| $TiO_2$ (White) | 650 | 650 |
| Final $H_2O$ | 107 | 111 |
| Biocide | 2.0 | 2.0 |
| Initial pH | 9.10 | 8.90 |
| 1 day viscosity (cps) | 490 | 370 |
| 6 week viscosity (cps) | 610 | Not tested |

The liquid coloring suspension of Sample 18 was thin but stable, and no separated water was observed on the surface after 6 days. The liquid coloring suspension of Sample 19 was also thin at 1 day, but no separated water was observed on the surface. Also, a tongue depressor inserted vertically into the suspension remained upright, indicating stability of the suspension.

Suspension viscosity is variable with respect to the size, shape and density of the pigment particles. Suitable viscosity ranges, depending upon the pigment solids being dispersed, may be between about 200 to about 4000 centipoise, in certain embodiments, between about 1500 to about 4000 centipoise. The maintenance of a consistent, workable viscosity over time without irreversible settling of solids or sludging for any particular pigment particles provides commercially valuable shelf life for the liquid coloring suspensions. The maintenance of an effective dispersion in the subject liquid coloring suspension further provides effective pumpability of the liquid coloring suspension, and increased ease of clean-up and maintenance of dispensing equipment, containers, tanks and vessels during maintenance cycles. These benefits are realized by use of the subject liquid coloring suspensions without sacrificing color strength and integrity in hue, value and chroma.

Use in Cementitious Compositions

Samples of the subject liquid coloring suspension were tested in cementitious compositions, in comparison with clay containing liquid coloring suspensions, and also against cementitious compositions without a coloring admixture. The cementitious mix design and results (slump or slump flow and gravimetric air content) are reported in Tables 9 and 10, below.

Samples 2 and 15 of the subject liquid coloring suspension, containing light red iron oxide pigment, and black iron oxide with carbon black pigments, respectively, were tested against uncolored cementitious mixtures 20 and 22, and Comparative Samples 21 containing light red iron oxide pigment and stabilized clay components, and Comparative Sample 23 containing black iron oxide with carbon black pigments and stabilized clay components. The levels of the liquid suspensions were equivalent to 3 pounds or 7 pounds of liquid coloring admixture per sack of cement (94 pounds).

The cement included in the cementitious mixtures was Lehigh Type I, and in addition to the liquid coloring admixture samples being included in the mix design, at 5 minutes an air entrainer (MICRO AIR™—ex BASF Admixture Systems) was added to the cementitious mixture.

The slump of the test compositions was determined by placing a cone on a flat surface, filling the cone with the cementitious composition, and removing the cone, as described in ASTM C143. The composition would then flow, and the displaced height (slump) of the resulting mound of the cementitious composition, as well as the diameter (slump flow) of the base of the mound, were measured in inches.

The gravimetric air content of the cementitious compositions were determined according to ASTM C138 by comparing measured density or batch volume to calculated density or volume, the density (unit weight) being determined by weighing a known volume of fresh cementitious material.

The subject liquid coloring suspensions gave comparable results with respect to slump flow and gravimetric air (tested at 5 and 10 minutes) as compared to the clay containing suspensions and plain concrete. At higher loading with one pigment, slump flow was partially affected.

TABLE 9

| | Sample No. | | | | |
|---|---|---|---|---|---|
| Admixtures | C20 Design mL/Batch | C21 Design mL/Batch | 2 Design mL/Batch | C21 Design mL/Batch | 2 Design mL/Batch |
| L-20 Light Red | | 363 | 363 | 845 | 845 |
| Micro Air | 5.6 | 1.9 | 1.9 | 1.9 | 1.9 |
| Color Suspension | | 3#/Sack | 3#/Sack | 7#/Sack | 7#/Sack |

TABLE 9-continued

| | Sample No. | | | | | | | | | |
|---|---|---|---|---|---|---|---|---|---|---|
| | C20 | | C21 | | 2 | | C21 | | 2 | |
| Materials | Batch Wt. (lb) | | Batch Wt. (lb) | | Batch Wt. (lb) | | Batch Wt. (lb) | | Batch Wt. (lb) | |
| Lehigh Type I Cement | 25.1 | | 25.1 | | 25.1 | | 25.1 | | 25.1 | |
| Stone #57 | 56.0 | | 56.0 | | 56.0 | | 56.0 | | 56.0 | |
| Stone #8 | 24.0 | | 24.0 | | 24.0 | | 24.0 | | 24.0 | |
| Sand | 62.7 | | 62.7 | | 62.7 | | 62.7 | | 62.7 | |
| Design Water | 12.44 | | 12.44 | | 12.44 | | 12.44 | | 12.44 | |
| Batch Material Weight, (lb). | 180.8 | | 180.6 | | 180.6 | | 180.5 | | 180.5 | |
| Elapsed Time, Minutes | 5 | 10 | 5 | 10 | 5 | 10 | 5 | 10 | 5 | 10 |
| Slump, inches | 6.50 | 6.00 | 6.75 | 6.00 | 7.75 | 6.50 | 6.50 | 6.50 | 2.50 | 4.75 |
| Gravimetric Air, % | 2.4 | 6.3 | 4.2 | 6.3 | 3.2 | 5.8 | 2.9 | 9.0 | 2.7 | 5.6 |
| Comments | | | | | Micro Air ™ added at 5 minute mark for each | | | | | |

TABLE 10

| | Sample No. | | | | | | | | | |
|---|---|---|---|---|---|---|---|---|---|---|
| | C22 | | C23 | | 15 | | C23 | | 15 | |
| Admixtures | Design mL/Batch | | Design mL/Batch | | Design mL/Batch | | Design mL/Batch | | Design mL/Batch | |
| L-10 Black | | | 363 | | 363 | | 845 | | 845 | |
| Micro Air | 4.8 | | 1.9 | | 1.9 | | 1.9 | | 1.9 | |
| Color Suspension | | | 3#/sack | | 3#/sack | | 7#/sack | | 7#/sack | |
| Materials | Batch Wt. (lb) | | Batch Wt. (lb) | | Batch Wt. (lb) | | Batch Wt. (lb) | | Batch Wt. (lb) | |
| Lehigh Type I Cement | 25.1 | | 25.1 | | 25.1 | | 25.1 | | 25.1 | |
| Stone #57 | 56.0 | | 56.0 | | 56.0 | | 56.0 | | 56.0 | |
| Stone #8 | 24.0 | | 24.0 | | 24.0 | | 24.0 | | 24.0 | |
| Sand | 62.7 | | 62.7 | | 62.7 | | 62.7 | | 62.7 | |
| Design Water | 12.44 | | 12.44 | | 12.44 | | 12.44 | | 12.44 | |
| Batch Material Wt., (lb). | 180.8 | | 180.8 | | 180.8 | | 180.8 | | 180.8 | |
| Elapsed Time, Minutes | 5 | 10 | 5 | 10 | 5 | 10 | 5 | 10 | 5 | 10 |
| Slump Flow, inches | 7.50 | 7.00 | 7.75 | 7.5 | 7.25 | 7.75 | 7.75 | 8.25 | 7.5 | 7.75 |
| Gravimetric Air, % | 2.4 | 6.0 | 2.4 | 6.6 | 2.9 | 5.3 | 2.1 | 6.0 | 2.4 | 7.1 |
| Comments | | | | | Micro Air ™ added at 5 minute mark for each | | | | | |

In certain embodiments, the thixotropic additive, such as a diutan gum polysaccharide, has a low shear viscosity when measured at 0.25 weight % gum in Synthetic Tap Water with PEG (3 rpm) of about 4000 to about 8000 mPa·s (cP), in certain embodiments about 3,000 to about 6,000 mPa·s (cP). The low shear viscosity test methodology includes the following: Using a glass stirring rod, disperse 0.75 g gum in 4.5 g of Polyethylene Glycol 200 (PEG200) in a 400-mL beaker. After a homogenous slurry is attained, pour 299 mL of Synthetic Tap Water (deionized water containing 1000 ppm NaCl and 147 ppm $CaCl_2$ $2H_2O$) into the slurry mixture. Stir the solution at 800 rpm using a low-pitched, propeller-type stirrer. After stirring for 4 hours, adjust the temperature to 25° C. (77° F.), and allow to sit undisturbed for 30 minutes without stirring. Measure the viscosity using the Brookfield Model LV viscometer equipped with a 2.5+ torque spring (or equivalent instrument such as a Model DVE 2.5+) at 3 rpm using the #1 LV spindle after allowing the spindle to rotate for 3 minutes.

In a first embodiment, there is provided a liquid coloring suspension for cementitious compositions comprising: a) liquid; b) polycarboxylate dispersant; c) pigment; and, d) polysaccharide thixotropic additive; wherein the viscosity of the liquid coloring suspension is stable over time.

In the liquid coloring suspension of the first or subsequent embodiments, the polysaccharide may be diutan gum.

In the liquid coloring suspension of the first or subsequent embodiments, the amount of polycarboxylate dispersant solids may be from about 0.5% to about 3%, pigment solids may be from about 50% to about 75%, and the polysaccharide thixotropic additive may be from about 0.025% to about 1%, based on the total weight of the liquid coloring suspension.

In the liquid coloring suspension of the first or subsequent embodiments, the amount of polycarboxylate dispersant solids may be from about 1% to about 2.5%, pigment solids may be from about 53% to about 70%, and thixotropic additive may be from about 0.1% to about 0.7%, based on the total weight of the liquid coloring suspension.

In the liquid coloring suspension of the first or subsequent embodiments, the liquid may comprise water.

In the liquid coloring suspension of the first or subsequent embodiments, the pigment may comprise an inorganic pigment.

In the liquid coloring suspension of the first or subsequent embodiments, the inorganic pigment may comprise carbon black or a metal containing pigment that comprises at least one of iron oxide, chromium oxide, aluminum oxide, lead chromate, titanium oxide, zinc white, zinc oxide, zinc sulfide, lead white, iron manganese black, cobalt green, manganese blue, manganese violet, cadmium sulfoselenide, chromium orange, nickel titanium yellow, chromium titanium yellow, cadmium sulfide, zinc yellow, cobalt blue, ultramarine blue, or mixtures thereof.

In the liquid coloring suspension of the first or subsequent embodiments, the pigment may comprise an organic pigment.

In the liquid coloring suspension of the first or subsequent embodiments, the organic pigment may comprise phthalocyanine.

The liquid coloring suspension of the first or subsequent embodiments may further comprise at least one of dispersant, water reducer, fungicidal admixture, insecticidal admixture, or germicidal admixture.

The liquid coloring suspension of the first or subsequent embodiments may be free of clay material.

The liquid coloring suspension of the first or subsequent embodiments may be free of cellulosic material.

In a second embodiment, there is provided a colored cementitious composition comprising hydraulic cement to which a liquid coloring suspension has been added, the liquid coloring suspension comprising: a) liquid; b) polycarboxylate dispersant; c) pigment; and, d) polysaccharide thixotropic additive; wherein the liquid coloring suspension improves the color in the cementitious composition without increasing the water demand.

In the colored cementitious composition of the second or subsequent embodiments, the polysaccharide may be diutan gum.

In the colored cementitious composition of the second or subsequent embodiments, the liquid may comprise water.

In the colored cementitious composition of the second or subsequent embodiments, the pigment may comprise an inorganic pigment.

In the colored cementitious composition of the second or subsequent embodiments, the inorganic pigment may comprise carbon black or a metal containing pigment that comprises at least one of iron oxide, chromium oxide, aluminum oxide, lead chromate, titanium oxide, zinc white, zinc oxide, zinc sulfide, lead white, iron manganese black, cobalt green, manganese blue, manganese violet, cadmium sulfoselenide, chromium orange, nickel titanium yellow, chromium titanium yellow, cadmium sulfide, zinc yellow, cobalt blue, ultramarine blue, or mixtures thereof.

In the colored cementitious composition of the second or subsequent embodiments, the pigment may comprise an organic pigment.

In the colored cementitious composition of the second or subsequent embodiments, the organic pigment may comprise phthalocyanine.

In the colored cementitious composition of the second or subsequent embodiments, the amount of polycarboxylate dispersant solids may be from about 0.0008% to about 0.51%, pigment solids may be from about 0.1% to about 10%, and thixotropic additive may be from about 0.00008% to about 0.17%, by total dry weight of cementitious binder.

In the colored cementitious composition of the second or subsequent embodiments, the amount of polycarboxylate dispersant solids may be from about 0.004% to about 0.25%, pigment solids may be from about 0.25% to about 6%, and thixotropic additive may be from about 0.0004% to about 0.07%, by total dry weight of cementitious binder.

In the colored cementitious composition of the second or subsequent embodiments, the water to cement ratio may be about 0.25 to about 0.7.

In the colored cementitious composition of the second or subsequent embodiments, the cement may comprise at least one of portland cement, modified portland cement, masonry cement, or mixtures thereof.

The colored cementitious composition of the second or subsequent embodiments may further comprise a cement admixture or additive, other than the liquid coloring suspension, that comprises at least one of at least one of air entrainer, set accelerator, set retarder, air detraining agent, foaming agent, corrosion inhibitor, shrinkage reducing admixture, crack reducing admixture, water reducer, fiber, pozzolan, strength enhancing agents, rheology modifying agent, water repellent, wetting agent, water soluble polymer, dampproofing admixture, gas former, permeability reducer, pumping aid, fungicidal admixture, germicidal admixture, insecticidal admixture, aggregate, alkali-reaction reducer, bonding admixture, polymeric microspheres, or mixtures thereof.

In the colored cementitious composition of the second or subsequent embodiments, the aggregate may comprise at least one of silica, quartz, crushed marble, glass spheres, granite, limestone, calcite, feldspar, alluvial sands, or sand.

In the colored cementitious composition of the second or subsequent embodiments, the pozzolan may comprise at least one of natural pozzolan, metakaolin, fly ash, silica fume, calcined clay, or blast furnace slag.

In the colored cementitious composition of the second or subsequent embodiments, the liquid coloring suspension may be free of clay material.

In the colored cementitious composition of the second or subsequent embodiments, the liquid coloring suspension may be free of cellulosic material.

Although the embodiments have been described in detail through the above description and the preceding examples, these examples are for the purpose of illustration only and it is understood that variations and modifications can be made by one skilled in the art without departing from the spirit and the scope of the disclosure. It should be understood that the embodiments described above are not only in the alternative, but can be combined.

We claim:

1. A liquid coloring suspension for cementitious compositions comprising:
    a) liquid;
    b) polycarboxylate dispersant;
    c) pigment; and,
    d) at least one microbially derived polysaccharide thixotropic additive selected from diutan gum, welan gum or combinations thereof; wherein the viscosity of the liquid coloring suspension is stable over time.

2. The liquid coloring suspension of claim 1, wherein the polysaccharide is diutan gum.

3. The liquid coloring suspension of claim 1, wherein the amount of polycarboxylate dispersant solids are from about 0.5% to about 3%, pigment solids are from about 50% to about 75%, and the polysaccharide thixotropic additive is from about 0.025% to about 1%, based on the total weight of the liquid coloring suspension.

4. The liquid coloring suspension of claim 1, wherein the amount of polycarboxylate dispersant solids are from about 1% to about 2.5%, pigment solids are from about 53% to about 70%, and thixotropic additive is from about 0.1% to about 0.7%, based on the total weight of the liquid coloring suspension.

5. The liquid coloring suspension of claim 1, wherein the liquid comprises water.

6. The liquid coloring suspension of claim 1, wherein the pigment comprises an inorganic pigment.

7. The liquid coloring suspension of claim 6, wherein the inorganic pigment comprises carbon black or a metal containing pigment that comprises at least one of iron oxide, chromium oxide, aluminum oxide, lead chromate, titanium oxide, zinc white, zinc oxide, zinc sulfide, lead white, iron manganese black, cobalt green, manganese blue, manganese violet, cadmium sulfoselenide, chromium orange, nickel titanium yellow, chromium titanium yellow, cadmium sulfide, zinc yellow, cobalt blue, ultramarine blue, or mixtures thereof.

8. The liquid coloring suspension of a claim 1, wherein the pigment comprises an organic pigment.

9. The liquid coloring suspension of claim 8 wherein the organic pigment comprises phthalocyanine.

10. The liquid coloring suspension of claim 1, further comprising at least one of additional dispersant, water reducer, fungicidal admixture, insecticidal admixture, or germicidal admixture.

11. A colored cementitious composition comprising hydraulic cement to which a liquid coloring suspension has been added, the liquid coloring suspension comprising:
 a) liquid;
 b) polycarboxylate dispersant;
 c) pigment; and,
 d) at least one microbially derived polysaccharide thixotropic additive selected from diutan gum, welan gum or combinations thereof; wherein the liquid coloring suspension improves the color in the cementitious composition without increasing the water demand.

12. The liquid coloring suspension of claim 11, wherein the polysaccharide is diutan gum.

13. The colored cementitious composition of claim 11, wherein the liquid comprises water.

14. The colored cementitious composition of claim 11, wherein the pigment comprises an inorganic pigment.

15. The colored cementitious composition of claim 14 wherein the inorganic pigment comprises carbon black or a metal containing pigment that comprises at least one of iron oxide, chromium oxide, aluminum oxide, lead chromate, titanium oxide, zinc white, zinc oxide, zinc sulfide, lead white, iron manganese black, cobalt green, manganese blue, manganese violet, cadmium sulfoselenide, chromium orange, nickel titanium yellow, chromium titanium yellow, cadmium sulfide, zinc yellow, cobalt blue, ultramarine blue, or mixtures thereof.

16. The colored cementitious composition of claim 11, wherein the pigment comprises an organic pigment.

17. The colored cementitious composition of claim 16 wherein the organic pigment comprises phthalocyanine.

18. The colored cementitious composition of claim 11, wherein the amount of polycarboxylate dispersant solids are from about 0.0008% to about 0.51%, pigment solids are from about 0.1% to about 10%, and thixotropic additive is from about 0.00008% to about 0.17%, by total dry weight of cementitious binder.

19. The colored cementitious composition of claim 11, wherein the amount of polycarboxylate dispersant solids are from about 0.004% to about 0.25%, pigment solids are from about 0.25% to about 6%, and thixotropic additive is from about 0.0004% to about 0.07%, by total dry weight of cementitious binder.

20. The colored cementitious composition of claim 11, having a water to cement ratio of about 0.25 to about 0.7.

21. The colored cementitious composition of claim 11, wherein the cement comprises at least one of portland cement, modified portland cement, masonry cement, or mixtures thereof.

22. The colored cementitious composition of claim 11, further comprising a cement admixture or additive, other than the liquid coloring suspension, that comprises at least one of air entrainer, set accelerator, set retarder, air detraining agent, foaming agent, corrosion inhibitor, shrinkage reducing admixture, crack reducing admixture, additional dispersant, water reducer, fiber, pozzolan, strength enhancing agents, rheology modifying agent, water repellent, wetting agent, water soluble polymer, dampproofing admixture, gas former, permeability reducer, pumping aid, fungicidal admixture, germicidal admixture, insecticidal admixture, aggregate, alkali-reaction reducer, bonding admixture, polymeric microspheres, or mixtures thereof.

23. The colored cementitious composition of claim 22, wherein the aggregate comprises at least one of silica, quartz, crushed marble, glass spheres, granite, limestone, calcite, feldspar, alluvial sands, or sand.

24. The colored cementitious composition of claim 22, wherein the pozzolan comprises at least one of natural pozzolan, metakaolin, fly ash, silica fume, calcined clay, or blast furnace slag.

* * * * *